Figure 1:
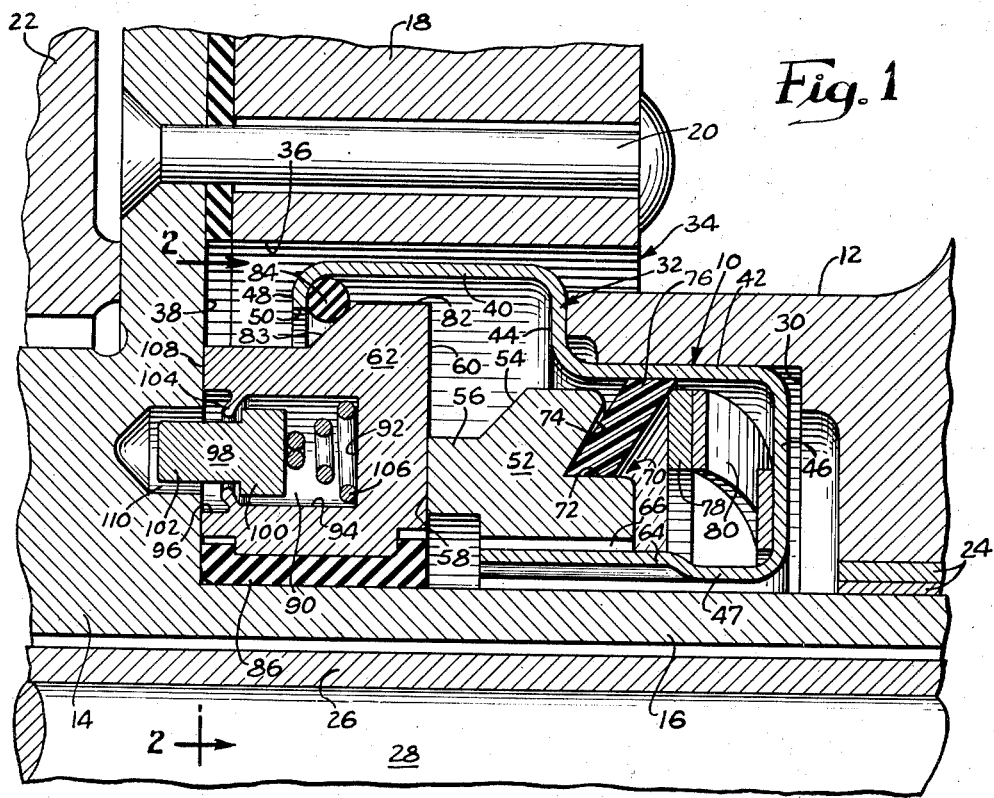

June 17, 1958 P. T. HAAKE 2,839,317
ROTARY MECHANICAL SEAL WITH SELF-LOCKING SEAT
Filed Nov. 1, 1954

Inventor
Paul T. Haake
by: Edward R. Lowndes

United States Patent Office 2,839,317
Patented June 17, 1958

2,839,317

ROTARY MECHANICAL SEAL WITH SELF-LOCKING SEAT

Paul T. Haake, Park Ridge, Ill., assignor to Crane Packing Company, Chicago, Ill., a corporation of Illinois Application November 1, 1954, Serial No. 466,113

3 Claims. (Cl. 286—11.13)

The present invention relates to rotary mechanical seals for effecting a seal between relatively rotatable machine elements, the seal utilizing radially disposed cooperating running seal surfaces to effect the sealing action. More particularly, the invention relates to a rotary mechanical seal of this general character in which the part which provides one of the radially disposed running surfaces has associated therewith locking means whereby the part, when operatively installed on one of the relatively moving elements undergoing sealing, may be held against rotation relative thereto so that if this element be stationary the part will be held against rotation and if the member be rotatable the part will be caused to rotate in unison therewith.

Briefly, rotary mechanical seals of the type outlined above include, among other parts, a sealing washer having a face thereon which is lapped so as to be substantially optically flat. This washer is designed for cooperation with a similar substantially optically flat surface provided on a seal seat. In certain installations it is necessary that the seat, which is in the form of an annular ring-like member, be pressed onto or into one of the relatively rotating elements utilizing a preloading sleeve of elastomeric or other resilient material which is interposed between the seat and the element with the seat being substantially or wholly contained within a recess provided in the element whereby, once the seat has been installed, it is inaccessible and concealed from view. Such an installation is generally known as a "blind installation" and one instance thereof occurs in connection with torque converters associated with automotive transmissions and particularly in connection with the front oil pump associated with hydraulic torque converters such as employ plural impeller and stator vanes.

In installations of this type it has been found that occasionally after prolonged use, the elastomeric material by means of which the seal seat is preloaded upon its central supporting member will become hardened and thus permit slippage of the seat on the member on which it is mounted, such slippage occurring by virtue of the counter-torque applied to it by the cooperating washer with which it has a running fit. Obviously, when such slippage occurs, the seal normally effected between the two running surfaces is destroyed and also the friction developed at the areas of slippage will rapidly destroy the seal at this region so that the entire seal assembly becomes worthless. It has heretofore been proposed as for example as shown in the patent to Hastings et al., 2,504,406, that relative rotation between a seal part which is installed within a "blind hole" may be prevented by providing interlocking members such as a fixed projection on the seal part which extends into a socket provided at the bottom of the blind recess. This method of preventing relative rotation between the parts is applicable to seal seats but it possesses a principal disadvantage in that difficulty is encountered in effecting initial alignment between the projecting member on the seal part and the socket into which the projecting member must extend. Inasmuch as the socket must be located at the bottom of the blind recess in which the seat is installed it is concealed from view and once the seat has been pressed or preloaded on the member which supports it, turning movement of the seat to effect alignment of the projecting member and socket is almost impossible so that there is no assurance that the projecting member and socket can be moved into register.

The present invention is designed to overcome the above noted limitations that are attendant upon the installation and use of rotary mechanical seals where the seal assembly or the seat element associated therewith must be installed within a blind opening provided for its reception and toward this end it contemplates the provision of an extremely simple yet efficient locking means whereby the seat or other seal part may be installed in position in the usual manner of installation without regard to possible future deterioration of the elastomeric preloading sleeve and consequent slippage of the seal member relative to the part on which it is installed.

The invention has been illustrated herein in connection with a well known type of rotary mechanical seal, the seal being of the so-called package-type and including an outer shell or retainer adapted to be installed by a press fit in a recess provided for it in one rotatable member. Disposed within the retainer is the usual washer member which is slidably sealed with respect to the retainer and which is spring pressed forwardly against the seal seat member as well as being operatively connected to the retainer by suitable driving means. The seal seat is partially disposed within the retainer against dislodgement therefrom and the entire seal assembly is adapted to be installed in a blind recess provided in the other rotatable member with the seal seat being preloaded upon a central hub or shaft by means of an interposed sleeve of elastomeric material. In order to prevent relative rotation between the seal seat and the hub on which it is mounted the hub is formed with a socket at the bottom of the blind recess and the seal seat is recessed to accommodate the installation therein of a spring pressed plunger which is normally projecting forwardly so as to extend beyond the confines of the seal seat. Upon engagement of the plunger with the bottom of the recess in which the seat is installed, the plunger assumes a retracted position within the seat and it will remain thus retracted as long as there is no relative rotation between the seat and the hub on which it is mounted. However, should any slippage occur, the plunger will ultimately become aligned with the socket provided in the hub so that the same will be projected into the socket, thus permanently locking the seat against relative movement with respect to the hub.

The provision of a seal element having such a locking means being among the principal objects of the invention, another object is to provide a locking means which is extremely simple in its construction and which is comprised of a minimum number of moving parts so that the same may be manufactured without materially increasing the cost of the seal assembly. Other objects and advantages of the invention not at this time enumerated will become more readily apparent as the nature of the invention is better understood.

In the accompanying single sheet of drawings forming a part of this specification a preferred embodiment of the invention has been shown.

Figure 2:
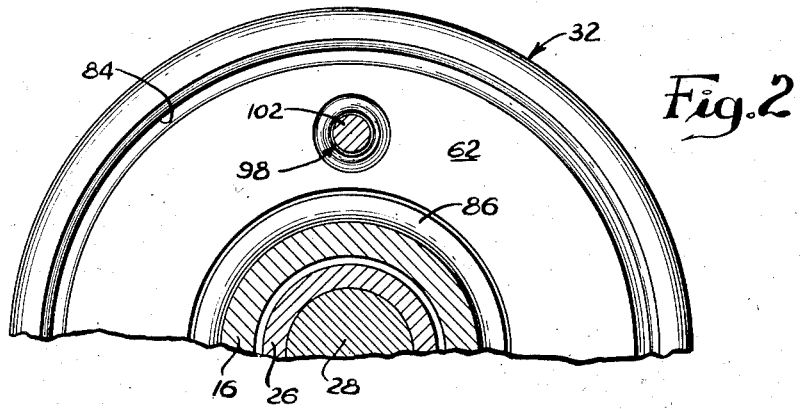

In these drawings:

Fig. 1 is a fragmentary sectional view taken substantially centrally through a torque converter installation showing the improved rotary mechanical seal of the present invention applied thereto, and Fig. 2 is a sectional view taken substantially along the line 2—2 of Fig. 1.

Referring now to the drawings in detail, the seal assembly comprising the present invention is designated in its entirety at 10 and it is shown operatively installed in a hydraulic torque converter mechanism, this illustration being purely exemplary inasmuch as the seal assembly is capable of installation in other mechanism having relatively rotatable parts. Only such portions of the torque converter assembly as are pertinent to the use of the present seal 10 have been illustrated and among these parts are the outer housing 12 of the front oil pump which is of the meshing gear type; the pump hub 14 including a sleeve-like extension 16; the torque converter housing 18 to which the hub 14 is secured as for example by means of rivets 20; and a fragment of one of the torque converter vanes 22. The sleeve 16 is rotatably journaled by a suitable sleeve bearing 24 in the gear pump housing 12. A central sleeve 26 operatively connected to the torque converter impeller and the transmission driven shaft 28 are incidental disclosures having no particular relation to the present seal assembly.

The gear pump housing 12 is rotatable relative to the pump hub 16 and it is necessary to effect a fluid seal between these two parts. Accordingly, the pump casing 12 is provided with an annular recess 30 therein into which there is pressed a retainer element 32 associated with the seal assembly 10. The pump hub 14 is secured to the torque converter housing 18 in such a manner that these two parts cooperate to produce a relatively deep recess 34 having a cylindrical wall 36 and a radial wall 38. The forward end of the pump casing 12 projects a slight distance into the recess 34 and the seal assembly is contained partially within the recess 30 and partially within the recess 34 between the end of the pump housing 12 and the bottom wall 38 of the recess 34.

The shell-like retainer 32 includes a cylindrical portion 40 of relatively large diameter, a reduced cylindrical portion 42 which is pressed into the recess 30, an interconnecting radial wall 44 and an end wall 46 which presents a slight clearance from the bottom of the recess 30. The retainer 32 is also provided with an inner cylindrical wall 47 which extends forwardly from the end wall 46. The retainer is provided with an open rim 48 which is turned radially inwardly to provide a central opening 50.

Disposed within the retainer 32 is a sealing washer 52 including a body portion 54 and a forwardly extending nose piece 56 having a forward face 58 which is lapped to a high degree of flatness and which is designed for running engagement with a similarly lapped flat face 60 provided on the rear side of a seal seat assembly designated in its entirety at 62 and which seat constitutes, in the main, the subject matter of the present invention.

The washer 52 is telescopically received over the cylindrical wall 47 of the retainer 32 and the latter is formed with a pair of diametrically opposed, longitudinally extending inwardly struck ribs 64 which extend into a pair of longitudinal grooves 66 provided in the central opening through the washer 52 and the interlocking ribs and grooves just mentioned constitute a driving means whereby the washer may be driven from the seal housing through the retainer shell 32.

The washer 52 is provided with a circular recess 70 in its rear face presenting a cylindrical wall 72 and a conical wall 74. In order to seal the washer 52 to the retainer shell 32 and prevent passage of fluid around the rear side of the washer, a sealing ring 76 in the form of a cone frustum and which is preferably formed of a material which is relatively incompressible, as for example the polytetrafluoroethylene polymer known as "Teflon," extends between the surface 72 and the cylindrical portion 42 of the retainer. "Teflon" is the trade-name of E. I. du Pont de Nemours & Co. and is described in Industrial and Engineering Chemistry, vol. 38, page 870, September, 1946. A thrust washer 78 has its outer periphery bearing against the rear face of the sealing ring 76 at a region adjacent its outer peripheral edge. A circular leaf spring 80 is disposed between the rear wall 46 of the retainer and the washer 78 and normally urges the washer forwardly into engagement with the sealing ring 76. The slant angle of the frusto-conical sealing ring 76 is somewhat greater than the radial distance between the surface 72 and the cylindrical wall 42 of the retainer so that the forward pressure exerted by the thrust washer 78 against the sealing ring 76 will cause a wedging action of the sealing ring 76 to obtain whereby the body of the frusto-conical ring tends to straighten out in radial fashion but is prevented from doing so by the space limitations provided for it. In this manner a strong wedging action is attained so that an effective seal occurs both at the inner and outer peripheries of the frusto-conical sealing ring 72.

The seal seat 62 may be formed of malleable metal and is in the form of a cylindrical ring having a radially extending enlargement 82 at its rear end which is wholly contained within the cylindrical confines of the retainer 32. The enlargement 82 is formed with a forwardly facing conical surface 83. The forward portion of the seat 62 projects outwardly through the opening 50 at the rim of the retainer and a split retaining ring 84 is interposed between the conical surface 83 and inturned rim 48 of the retainer to prevent removal of the seat from the retainer thus providing a package-type seal assembly unit capable of being installed bodily and in its entirety in the space provided for it between the relatively movable parts 12 and 14 of the torque converter mechanism. It is to be noted that the overall diameter of the enlargement 82 is less than the diameter of the opening 50 so that the seat normally may be inserted into the retainer through the opening 50. The inner diameter of the retaining ring 84 is smaller than the diameter of the opening 50 and also is smaller than the overall diameter of the enlargement 82 so that the ring, when in position within the retainer, will engage the conical surface 83 and serve to center the seat axially within the opening 50.

The seat member 62 is preloaded upon the sleeve-like extension 16 of the pump hub 14 by means of an elastomeric sleeve 86 which surrounds the sleeve 16 and is interposed between the seat member 62 and sleeve. The sleeve 86 is maintained under compression and is purported to establish a driving connection between the pump hub and the seat member 62 so that these two members will rotate in unison with the seat turning relative to the washer 52.

It sometimes happens that in installations of this nature the elastomeric material of the sleeve 86 will lose its resiliency so that slippage between the seat member 62 and pump hub 14 will occur. Under these conditions the effectiveness of the seal assembly is destroyed inasmuch as there will be a tendency for the seat 62 to be retarded in its rotational movement, even to the extent wherein it becomes frozen to and rotates with the washer 52. In order to overcome this limitation that is attendant upon the use of seals of this general type, according to the present invention, the body of the seat 62 is formed with a forwardly facing socket or well 90 having a bottom wall 92, a cylindrical bore 94 and a counterbore 96 near the front wall opening of slightly larger diameter than the diameter of the bore 94. Slidably disposed within the socket 90 is a plunger 98 having an enlarged head 100 formed thereon and a forwardly extending shank portion 102 which projects outwardly through the forward end of the socket 90. The shoulder existing between the bore 94 and counterbore 96 is staked inwardly as at 104 to provide an internal rib for the purpose of preventing removal of the plunger 98 from the seat 62. A conical compression spring 106 serves to normally urge the plunger 98 to its advanced position as shown in Fig. 1 wherein the plunger is extended forwardly from the front face 108 of the seat. The radial wall 38 of the recess 34 is provided with a drilled hole or socket 110 designed for register with the projecting end of the plunger 98 so that when the seat 62 is operatively installed upon the sleeve 16 of the pump hub 14, any relative rotation which may occur between the seat 62 and hub 14 will eventually bring the plunger 98 into register with the socket 110 whereby the plunger will be projected under the influence of the spring 106 into the socket to lock the seat 62 to the hub 14 against relative rotation with respect thereto.

It is to be noted that upon initial installation of the seal assembly 10 in position on the sleeve 16, the seat 62 may be preloaded by means of the elastomeric sleeve 86 on the sleeve 16 without regard to its circumferential orientation, which is to say that no attempt need be made to align the plunger 98 with the socket 110. The seat 62 is merely pushed into the recess 34 over the sleeve 16 and in more instances than not, the plunger will strike the bottom radial wall 38 of the recess so as to force the plunger 98 against the action of the spring 106 fully into the socket 90 in which it is sildably disposed. The hub 12 will move into position in the torque converter assembly as the seal assembly 10 is thus moved bodily forwardly inasmuch as the retainer 32 is pressed into the recess 30 prior to installation of the seal assembly over the sleeve 16. The seat 62 may remain in its initially installed circumferential position throughout the entire life of the seal and, in such instances, the plunger 98 and socket 110 will never have any effectiveness. However, in rare instances which are an exception to the rule, as for example when the frictional effectiveness of the elastomeric sleeve 86 is destroyed, there will be a tendency for circumferential slippage of the seat relative to the hub 14 but in no instance can this slippage exceed 360° inasmuch as during the first rotational turn of the seat 62 relative to the hub 14 the plunger 98 will seek a position within the socket 110 and move to its advanced home position thus effectively locking the seat against further turning movement.

The invention is not to be limited to the exact arrangement of parts shown in the accompanying drawing and described in this specification since various changes in the details of construction of the seal may be resorted to without departing from the spirit of the invention. Furthermore, the seal is capable of installation in assemblies other than torque converter devices nor is it necessary that both of the parts which the seal assembly is intended to seal be rotatable. It is merely sufficient that one of these members be rotatable relative to the other. The character of the washer 52 and the means whereby it is sealed to the retainer 32 may be widely different from the sealing means illustrated herein. Still further, while the seat 62 has been illustrated as being preloaded upon a central sleeve or member such as the member 16 it is contemplated that this seat may be preloaded by suitable means against a cylindrical confining wall which encircles the seat. Finally, although the seal assembly 10 illustrated herein is of the package-type utilizing an outer shell or retainer 32, the assembly may consist of separable parts wherein the seat is sealed in any suitable manner to one of the parts while the washer is likewise sealed to the other part, the main characteristic of the present invention being the provision of the self-locking seat and the means whereby it may be held against rotation relative to the member with which it is designed to rotate. Only in so far as the invention has been pointed out in the accompanying claims is the same to be limited.

What I claim and desire to secure by Letters Patent is:

1. In a rotary mechanical seal for relatively movable elements, said seal having relatively rotatable sealing members, means for flexibly sealing one of said members with respect to one of said elements, press-fit means for sealing and securing the other ealing member to the other element, an axially fixed abutment against which the said other sealing member constantly bears, and auxiliary means for securing the said other sealing member to the said other element, said auxiliary means comprising a pin having a portion of larger diameter at one end region thereof, there being a recess in the said other member to receive the said larger diameter portion, means on the said other member adapted to engage the larger diameter portion to prevent egress of the pin from the recess in the said other member, and a recess in the said other element to receive the end of the pin opposite the larger diameter portion, and resilient means in the recess in the said other member bearing against the pin and urging the pin out of the recess in the said other member.

2. In a rotary mechanical seal the combination described in claim 1, the means on the said other member adapted to engage the larger diameter portion of the pin comprising an internal rib formed integrally with the said other member.

3. In a rotary mechanical seal the combination described in claim 1, the recess in the said other member being deep enough to receive the entire pin and the resilient means.

References Cited in the file of this patent

UNITED STATES PATENTS

| | | |
|---|---|---|
| 1,470,621 | Jackson | Oct. 16, 1923 |
| 1,674,936 | Williams | June 26, 1928 |
| 2,135,759 | Mabee | Nov. 8, 1938 |
| 2,365,046 | Bottomley | Dec. 12, 1944 |
| 2,571,035 | Hastings | Oct. 9, 1951 |

FOREIGN PATENTS

| | | |
|---|---|---|
| 596,089 | Germany | May 3, 1934 |